(12) United States Patent
Maus et al.

(10) Patent No.: US 11,392,927 B2
(45) Date of Patent: Jul. 19, 2022

(54) MULTI-FUNCTION DATA KEY

(71) Applicants: Christopher Maus, Sandpoint, ID (US); Brandon Maus, Sandpoint, ID (US)

(72) Inventors: Christopher Maus, Sandpoint, ID (US); Brandon Maus, Sandpoint, ID (US)

(73) Assignee: uQontrol, Inc., Sandpoint, ID (US)

( * ) Notice: Subject to any disclaimer, the term of this patent is extended or adjusted under 35 U.S.C. 154(b) by 870 days.

(21) Appl. No.: 15/728,768

(22) Filed: Oct. 10, 2017

(65) Prior Publication Data

US 2018/0047014 A1 Feb. 15, 2018

Related U.S. Application Data

(63) Continuation-in-part of application No. 14/744,812, filed on Jun. 19, 2015, now Pat. No. 10,032,162, (Continued)

(51) Int. Cl.
*G06Q 20/34* (2012.01)
*G06Q 20/32* (2012.01)
(Continued)

(52) U.S. Cl.
CPC .......... *G06Q 20/341* (2013.01); *G06F 21/31* (2013.01); *G06Q 20/02* (2013.01); *G06Q 20/30* (2013.01); *G06Q 20/322* (2013.01); *G06Q 20/3226* (2013.01); *G06Q 20/3274* (2013.01); *G06Q 20/3278* (2013.01); *G06Q 20/353* (2013.01);
(Continued)

(58) Field of Classification Search
CPC .................................................. G06Q 20/341
See application file for complete search history.

(56) References Cited

U.S. PATENT DOCUMENTS

| | | | | |
|---|---|---|---|---|
| 5,892,900 A | * | 4/1999 | Ginter | ..................... G06F 21/10 726/26 |
| 2007/0220253 A1 | * | 9/2007 | Law | ...................... G06F 21/445 713/168 |

(Continued)

*Primary Examiner* — John W Hayes
*Assistant Examiner* — Zehra Raza
(74) *Attorney, Agent, or Firm* — Mehrman Law Office; Michael J. Mehrman

(57) ABSTRACT

A data key for secure financial and other types of data transactions with a key-shaped case, lightbox touch sensor carrying a removable wafer, processor, secure memory, general-purpose memory, battery, antenna, speaker, microphone, and a dual-purpose USB and chip pin pad. Bluetooth, NFC and/or RFID provides the ability to pair the data key through a wireless channel with another device, such as a smartphone, using a pairing button on the back of the data key. The data key provides chip-and-pin type security to online financial transactions. Dual-device security requires both the data key and another communication device registered to an authorized user to be present to activate the data key for secure operations. Device pairing enables geo-proximity features, such as dual-device security with a paired device, key finder, phone finder, and panic button. The data key may provide secure, remotely programmable security for building and equipment access.

19 Claims, 7 Drawing Sheets

Related U.S. Application Data which is a continuation-in-part of application No. 14/596,089, filed on Jan. 13, 2015.

(60) Provisional application No. 61/926,437, filed on Jan. 13, 2014.

(51) Int. Cl.

| | | |
|---|---|---|
| *G06Q 20/02* | (2012.01) | |
| *G06F 21/31* | (2013.01) | |
| *G06Q 20/40* | (2012.01) | |
| *H04L 67/04* | (2022.01) | |
| *H04L 67/12* | (2022.01) | |
| *G06Q 20/38* | (2012.01) | |
| *G06Q 20/30* | (2012.01) | |
| *G06Q 20/42* | (2012.01) | |
| *H04L 67/53* | (2022.01) | |
| *H04L 9/40* | (2022.01) | |

(52) U.S. Cl.
CPC ......... *G06Q 20/382* (2013.01); *G06Q 20/385* (2013.01); *G06Q 20/3829* (2013.01); *G06Q 20/40145* (2013.01); *G06Q 20/425* (2013.01); *H04L 63/0838* (2013.01); *H04L 63/0853* (2013.01); *H04L 67/04* (2013.01); *H04L 67/12* (2013.01); *H04L 67/20* (2013.01)

(56) References Cited

U.S. PATENT DOCUMENTS

| | | | | |
|---|---|---|---|---|
| 2007/0252010 | A1* | 11/2007 | Gonzalez | G11B 33/0488 235/492 |
| 2010/0174750 | A1* | 7/2010 | Donovan | G16H 10/60 707/781 |
| 2010/0274677 | A1* | 10/2010 | Florek | G06Q 20/363 705/16 |
| 2015/0039494 | A1* | 2/2015 | Sinton | G06Q 20/327 705/39 |

* cited by examiner

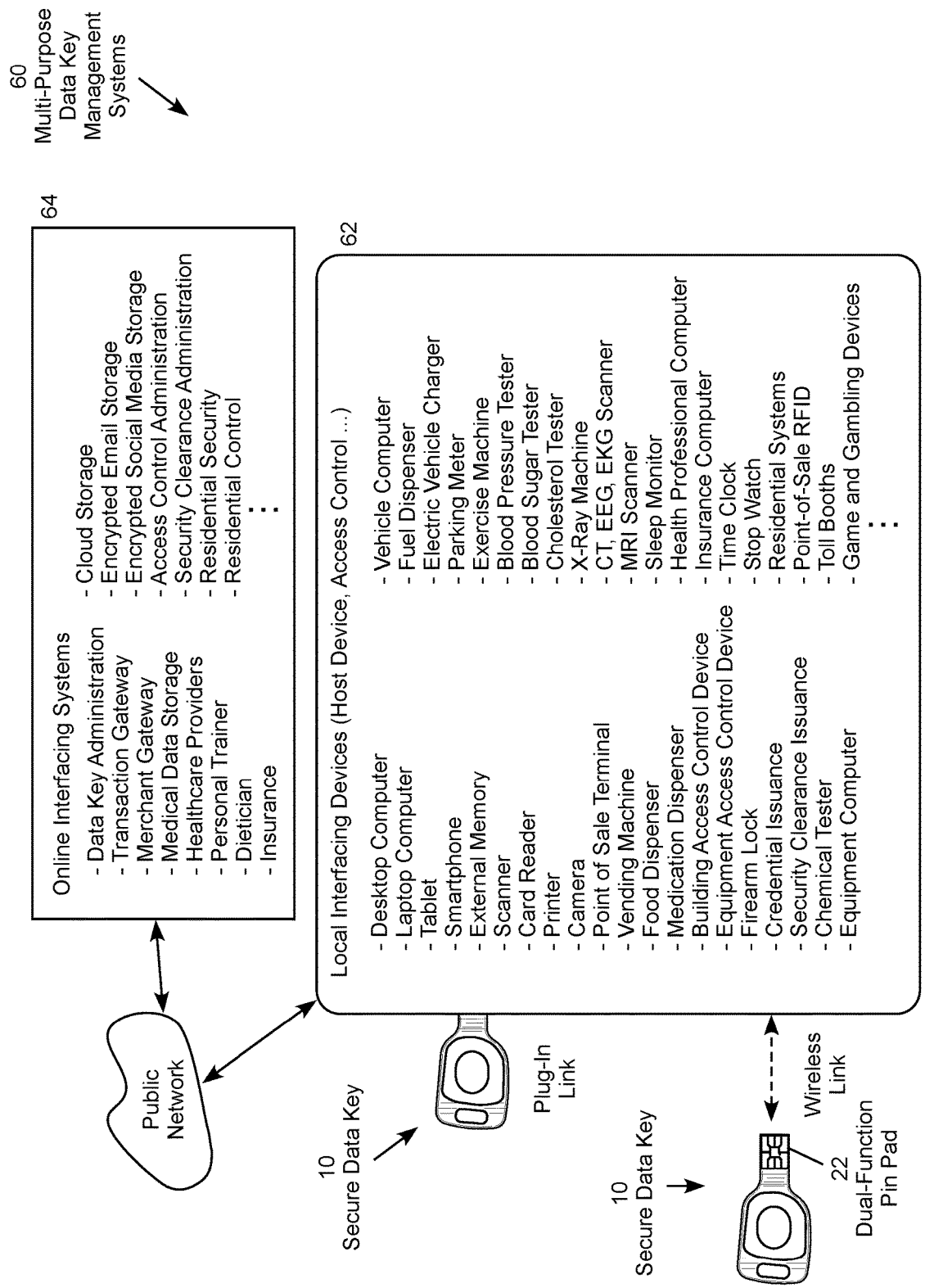

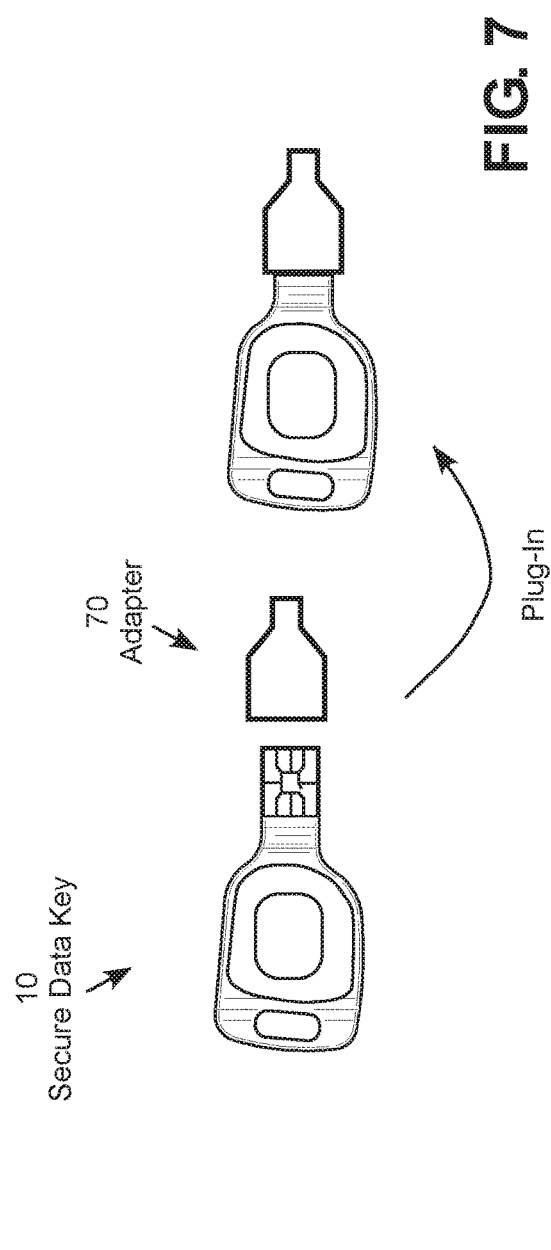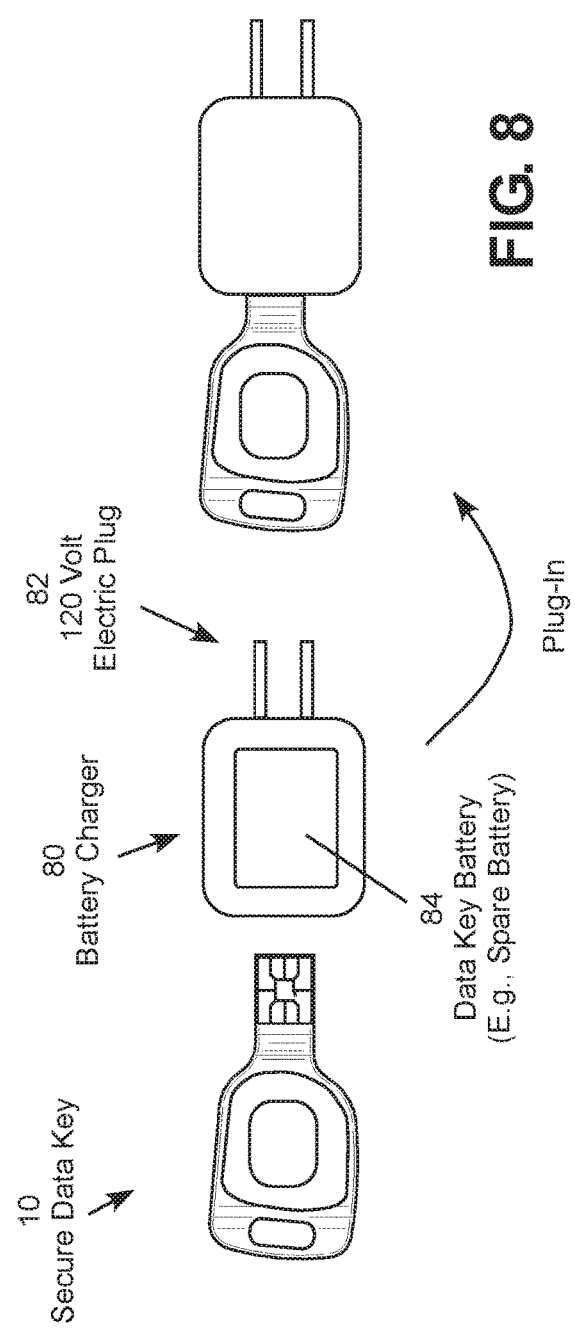

MULTI-FUNCTION DATA KEY

PRIORITY CLAIM TO RELATED APPLICATION

This application claims priority to commonly-owned U.S. Provisional Patent Application Ser. No. 61/926,437 entitled "Qkey Mobile PIN Pad Emulator," filed on Jan. 13, 2014; U.S. patent application Ser. No. 14/596,089 entitled "Data Storage Key For Secure Online Transactions" filed on Jan. 13, 2015; and U.S. patent application Ser. No. 14/744,812 entitled "Multi-Purpose Data Storage Key" filed Jun. 19, 2015, which are incorporated by reference.

TECHNICAL FIELD

The present invention relates to the field of multi-function security devices for conducting a wide range of operations involving electronic data. More particularly, a data key provides secure, encrypted and dual-device online purchases, merchant transactions, building and equipment access, firearm locks, email, social media, personal health record, and other types of electronic data transactions.

BACKGROUND

Large scale credit and debit card security breaches have highlighted the need for improved data security for financial transactions and other types of digital access control. Europe has implemented "chip card" (Euro/MasterCard/VISA "EMV") financial account cards (generally referred to as "chip-and-pin" technology regardless of whether a 'PIN" is always required) to improve security for in-store transactions where the chip-and-pin card is physically present at the point of sale. The United States is currently in the process of converting to the chip-and-pin (EMV) standard to obtain the same type of security improvement in this country. At present, however, chip-and-pin technology only provides improved security for transactions when the chip-and-pin card is physically preset to be processed by a point-of-sale chip-and-pin card reader. Because chip-and-pin readers are generally not available at the homes of individuals and other locations used to conduct online commerce, chip-and-pin technology will not improve the security online transactions, which are the most vulnerable type of transaction. During the online transaction process, sensitive personal and financial transaction data is vulnerable to hijacking when stored in browser cookies and other storage locations on the host computer. The data is also vulnerable to hackers when sent from the host computer used by the online consumer to the web account and payment gateway of the merchant processing the online transactions. This data is often encrypted once it reaches a secure website (e.g., https), but is may not be encrypted on the data initial link over a public network (e.g., the Internet) from the host computer to the secure site.

This initial data link over the public network presents a number of points vulnerable to hackers during online commerce transactions including, among others, keystroke monitoring when personal data and financial card data is entered into the host computer, browser cookies storing the consumer's personal data and financial card data, and storage of this and other personal data on the webserver of the online merchant. One approach to providing chip-and-pin type security for online purchases would be to provide individual consumers with chip-and-pin readers to utilize as part of their personal computer equipment. But this would be extremely expensive, however, and at least partially ineffective because consumers are unlikely to have their own chip-and-pin terminal with them everywhere they want to conduct online commerce in the increasingly mobile computing environment. In addition, chip-and-pin terminals are presently limited to merchant accounts which require payment of monthly fees that few individual consumers would be willing to pay. Issuing a large number of chip-and-pin terminals to end-use consumers would also blur the distinction between merchants and consumers and impose multiple layers of transaction processing that the financial transaction infrastructure is not presently configured to accommodate.

A wide range of other applications could benefit from improved security and convenient access, such as electronic file storage, building and equipment access systems, email, social media, personal health records, and the like. To be widely implemented, the applications should be compatible with existing system without requiring major changes to existing infrastructure.

There is, therefore, a need for a convenient and effective mechanism to provide improved security and convenient access for a wide range of operations involving electronic data. More specifically, there is a need for cost effective mechanisms for providing a variety of security features for a wide range of operations involving electronic data without requiring major changes to existing infrastructure.

SUMMARY OF THE INVENTION

The present invention meets the needs described above in multi-function data key for conducting a wide range of operations involving electronic data. An illustrative embodiment includes a key-shaped case housing a processor, a secure memory, a general-purpose memory, a data port, a lightbox user-operable switch, a wafer removably held within the light box comprising indicia backlit by the lightbox, and a battery providing electric power to the data key. In a particular embodiment, for example, the data key incorporates a USB flash memory drive, a USB data port, and a pairing button for wirelessly connecting the data key to external interfacing devices. The processor may require user operation of the lightbox switch, which may involve a specific input sequence (click or touch pattern), gesture or bio-identifier, to access data stored in the secure memory.

In various embodiments, the data key may also include a speaker, a microphone, a dual-use data port pin pad that operates as a 4-pin USB connector and as an 8-pin chip-and-pin connector, a wireless transmitter, and a pairing button for establishing a paired-device wireless communication links between the data key and interfacing devices, such as a mobile communication device, such as a smartphone, tablet, body-worn computer, and so forth. The data key and the mobile communication device may engage in dual-device security requiring entry of user commands into both the data key and the mobile communication device to access data stored in the secure memory. The mobile communication device may also store a GPS location at a time when the paired device wireless communication link is lost with the data key to aid in finding the data key when the data key becomes lost. The mobile communication device may announce or display an alarm in response to user entry of a predefined command using the lightbox switch on the data key to aid in finding the mobile communication device when the mobile communication device becomes lost. The mobile communication device my also transmit an emergency distress signal in response to user entry of a predefined command using the lightbox switch on the data key. As another feature example, the processor may perform speech recognition to allow access to data stored on the secure memory.

In various embodiments, the data key may be used provide secure access to a building, secure access to a piece of equipment, secure access to a firearm, and so forth. User operation of the lightbox switch may be received to implement a card-not-present financial transactions, key-must-be-present financial transactions, non-contact financial transactions, and merchant account transactions using a financial account number received from a third party. The data key may actively manage online identifiers used by the data key to access interfacing systems over a public network, and may implement a concealed primary account number (PAN) transaction over a public network utilizing the PAN and a reloadable prepaid account number. Different click patterns, button hold times or gestures may activate different functions.

Embodiments of the data key have a number of different physical features and implement a number of different functional features described in the figures and text of this disclosure. These features and functions need not all be present in any particular embodiment, and various combinations may be implemented in particular alternative embodiments. Each physical feature and functional feature described in this disclosure should therefore be considered an option with only the granted claims serving to specify the elements of a particular patented invention.

The specific techniques and structures for implementing particular embodiments of the invention, and thereby accomplishing the advantages described above, will become apparent from the following detailed description of the embodiments and the appended drawings and claims.

BRIEF DESCRIPTION OF THE DRAWINGS

FIG. 6 is a block diagram illustrating multiple uses of the data key.

FIG. 7 is a conceptual diagram illustrating a connection.

FIG. 8 is a conceptual diagram illustrating a battery.

DETAILED DESCRIPTION OF THE EMBODIMENTS

Figure 1:
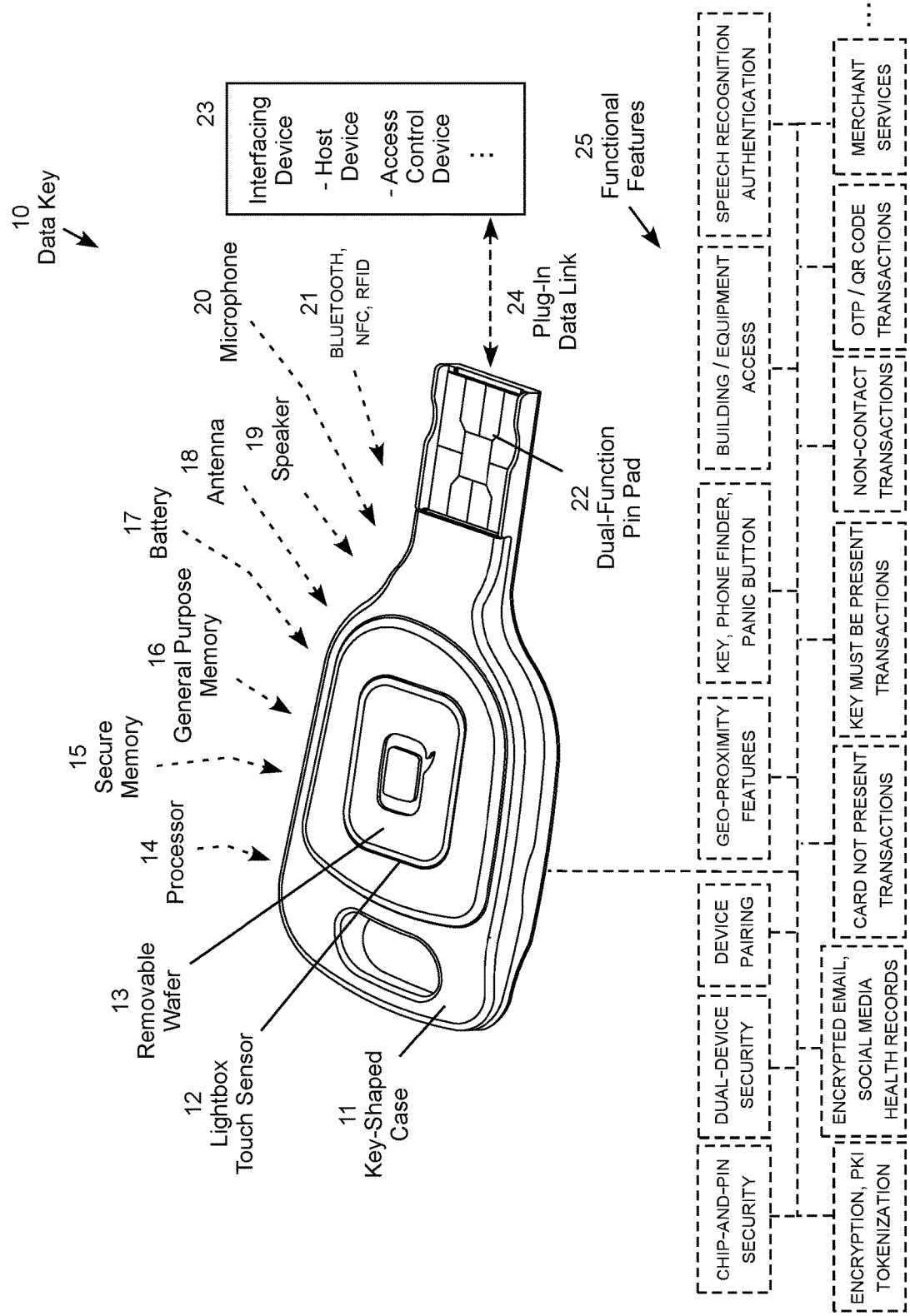
FIG. 1 is perspective front view of a data key with a block diagram indicating functional features.

Embodiments of the invention may be realized in a multi-function data key for conducting a wide range of operations involving electronic data. This application describes additional features and improvements building upon the data key described in commonly-owned U.S. Provisional Patent Application Ser. No. 61/926,437 entitled "Qkey Mobile PIN Pad Emulator," filed on Jan. 13, 2014; U.S. patent application Ser. No. 14/596,089 entitled "Data Storage Key For Secure Online Transactions" filed on Jan. 13, 2015; and U.S. patent application Ser. No. 14/744,812 entitled "Multi-Purpose Data Storage Key" filed Jun. 19, 2015, which are incorporated by reference. The data key may also replace or cooperate with a smartcard to implement or cooperate with the technology described in one or more of U.S. Pat. No. 8,800,877 entitled "RFID Reporting Personal Health Card and Related Systems"; U.S. Pat. No. 8,678,294 entitled "Federated ID Secure Virtual Terminal Emulation Smartcard"; and U.S. Pat. No. 8,239,627 entitled "Smartcard Accessed Dual Server Electronic Data Storage System"; each of which is incorporated by reference.

A particular embodiment of the data key appears similar to a conventional USB flash drive modified to have a physical shape resembling a door key with an eyelet for attaching the data key to a key ring or lanyard. The data key may include one or more of a wide range of physical features including a key-shaped case, lightbox touch sensor carrying a removable wafer, processor, secure memory, general-purpose memory, battery, antenna, speaker, and microphone. A dual-purpose pin pad functions with USB and chip-and-pin readers. The data key may also include Bluetooth, NFC and/or RFID wireless communication capability and the ability to be paired through a wireless channel with another device, such as a smartphone, using a pairing button on the back of the data key.

The data key is configured to provide one or more of a wide range of functional features. For example, chip-and-pin security affords online financial transactions with the same type of security provided to in-store transactions at chip-and-pin terminals. Dual-device security requires both the data key and another communication device registered to an authorized user, such as a smartphone, to be present to activate the data key for secure operations. Device pairing enables a number of geo-proximity features, such as dual-device security with a paired device, key-finder, phone-finder, and panic button. The data key may provide secure, programmable and remotely programmable security for building and equipment access. Bio-identifier, click or touch sequence lock, gesture recognition, speech recognition, and artificial intelligence security features may be used to control access to the data key.

The data key may also implement encryption, such as PKI and tokenization using pictorial or graphical data encryption. Encryption supports secure financial transactions, user credentials, file storage, email, social media, personal health records, and any other data the user selects for storage in the secured data partition on the data key. In addition to chip-and-pin tokenized financial transactions, the data key may be used in "dual-device security"; "card-not-present" and "key-must-be-present" transactions. The data key may be used in non-contact (NFC) transactions, as well as one-time-pin (OTP) and QR code transactions. In addition to customer purchase transactions, the data key may support merchant services.

One new physical feature of the data key includes a lightbox with a removable wafer that can be used to personalize the data key with a logo, monogram, bio-identifier or other item selected by the user, vendor or manufacturer. The wafer is held within the light box so that indicia on the wafer, such as a logo or monogram, is backlit by the lightbox. The wafer may include or cooperate with a gesture detector or a bio-identifier, such as a fingerprint detector. The wafer can be easily removed and replaced with a different wafer carrying different indicia and implementing ore cooperating with different functions, as desired.

Another new physical feature includes a pairing button on the rear of the data key allowing the data key to be paired to an interfacing device, such as a smartphone, merchant terminal, or wide range of other interfacing devices. Device pairing enables or enhances a number of dual-device and geo-proximity functions, such as dual-device security, key-finder, phone-finder, panic button, and the like. The data key also includes an enlarged battery, speaker and microphone, and an expanded case to house these components the enable or enhance a number of features, such as geo-proximity functions, secure building and equipment access, speech recognition authentication, card-not-present transactions, key-must-be present transactions, non-contact (NFC) transactions, OTP and QR transactions, merchant services, and other features using onboard battery power. Enhanced encryption functions enable to enhance a number of features, such as PKI and tokenized financial transactions, secure file storage, secure building and equipment access, encrypted email and social media, secure health records, and other featured that may utilize various types of encryption.

In the context of the data key, website account access and online transactions include financial transactions, such as credit, debit card and reloadable prepaid card purchases, as well as other types of data transactions which are secured and control by the key. For example, network access to secure data files, such as business records, social media, email, personal health records, and any other type of data stored online or on the data key, fall within the meaning of online transactions. The data key may also be used to replace passwords with dynamic tokens or cryptograms traditional used in chip-and-pin payment transactions.

In a basic transaction mode, the data key transmits stored personal data (e.g., financial account holder identification information) and account numbers (e.g., credit or debit card number, expiration date, and non-embossed verification cods) to an online financial transaction processor without the user having to type that sensitive data or have it stored in browsers cookies or any other locations on the host computer used to select the item for purchase. The data key stores this sensitive information in an encrypted format and may transmit the sensitive data using encrypted or unencrypted format depending on the requirements of the receiving transaction processor. The data key is therefore backwardly compatible with conventional online transaction processors configured purchasers with magnetic strip financial cards, and forwardly compatible with transaction servers configured purchasers with chip-and-pin financial cards that communicate in the form of public key infrastructure (PKI) encrypted packets sometimes encoded by security tokens. The same security features apply to passwords, fast identity online (FIDO), bio identifiers, and all other secure data stored on the data key. The data key typically contains a secure data partition (which may be a physical or virtual partition) controlled by the onboard microprocessor and an unsecured partition that operates like a conventional USB flash drive.

The data key is also compatible with various security features implemented by conventional transaction servers, such as one-time-pin (OTP) and quick response (QR) pictorial codes using dual-device security. The data key may also implement near-field communication (NFC) functionality allowing it to function as a credit or debit card with conventional "touch-and-go" point-of-service (POS) card readers. Expected features or future transaction server technology referred to generally as dynamic payment exchange or dynamic authorization is also supported. This involves the payment exchange maintaining dual-device correlations, and requiring communication with a financial account holder on two communication modes (e.g., payment terminal and mobile telephone) in order to authenticate transactions. The data key, in some cases in concert with an online server, has the ability to support existing transaction protocols and adjust to future protocols as they may be deployed in the future for enhancing both online and POS transactions. The data key may also store transaction data for multiple financial accounts (e.g. storing all of a user's credit and cards on one device), support online and POS transactions, and store non-conventional currencies (such as BIT-COIN® and similar financial instruments).

The data key communicates transaction data (in encrypted or non-encrypted format as my be required by the receiving processor) at any point in the transaction cycle that the receiving processor is configured to accept. That is, the data key may transmit data to the payment gateway operated by a retail vendor (e.g., Amazon®), or the backend server operated by the transaction processor (e.g., VISA®), depending on the format and location accepted by the processing system. The data key has this capability because it has a built-in microprocessor, PKI encryption capability, TCP/IP and browser functionality. The data key also works in concert with, and communicates with, an online support system which allows each key to be updated with downloads, unique apps provide by third parties and supplemented with online functionality (e.g., a mobile telephone emulator) to supply any components functionality not available in a particular operating environment (e.g., where a mobile telephone or mobile telephone service is not available). The data key can therefore keep up with differences in, and changes made to, financial processing systems as well as operating environments. The data key description therefore covers a wide range of physical features, functional features, and transaction modes that need not all be in play in any particular device or transaction. Rather, major advantages achieved by virtue of the onboard microprocessor and online augmentation of the data key are effectively unlimited backward and forward compatibility with transaction processing systems, the ability to engage in virtually any type of transaction process supported a transaction processing systems, and the ability to adapt to just about any type of operating environment with at least an Internet connection and a USB port or wireless communication capability.

An illustrative data key for conducting secure transactions includes a non-volatile solid state memory, a microprocessor operative for storing encrypted data in the memory, a data port for communicating data stored in the memory between the data key and a host computer, and a touch or depression sensor configured for responding to human engagement with the sensor by temporarily activating the microprocessor for engaging in secure transactions utilizing the encrypted data stored in the memory and a host computer in operative communication with the data key. The memory, microprocessor, data port, and touch or depression sensor are configured as an integrated unit that is conveniently removable from operative connection with the host computer and portable by a computer user. The encrypted data stored in the memory comprises personal identification data associated with a registered user of the data key and transaction account data associated with the registered user of the data key.

The microprocessor may be further configured to conduct transactions using the encrypted data in the memory through a dual-device security protocol involving a mobile device registered for use with the data key. The microprocessor may be further configured to participate in the dual-device security protocol by generating an initiation one-time-password (OTP) for used in connection with a transaction, transmit the OTP to a mobile device registered to the user of the data key, receive a return OTP from the mobile device, and transmit the personal identification data and transaction account data to a transaction processor in response to detecting a match between the initiation OTP and the return OTP. In particular, the microprocessor may be further configured to generate an initiation one-time-password (OTP) for used in connection with a transaction, transmit the OTP to a mobile device registered with the data key for use with the data key. The dual-device security protocol may utilize a mobile app configured to running on the mobile device exposing a touchscreen pin pad on the mobile device for receiving user entry of the return OTP without utilization of keystrokes on the mobile device.

The data port may be a USB plug or a wireless data port. The data key may engage in the dual-device security protocol using the USB plug for establishing a first communication link with a host computer, and using a wireless data port for establishing a second communication link with a mobile device for engaging in the dual-device security protocol. The dual-device security protocol may utilize an OTP or a pictorial code generated by the data key or a transaction processor participating in the dual-device security protocol. The microprocessor may transmit data stored in the memory to a transaction processor encrypted in PKI, token, or cryptogram format.

The memory of the data key may also include an unsecured data partition operative without operation of the microprocessor and a battery for powering the data key to engage in secure transactions through wireless communications without physical connection to another device. The data key may also include a near-field communication (NFC) antenna operative for wirelessly communicating with an NFC point-of-sale (POS) terminal to engaging in a transaction with the POS terminal.

An illustrative system for conducting secure transactions includes a data key comprising a non-volatile solid state memory, a microprocessor operative for storing encrypted data in the memory, and a data port for communicating data stored in the memory between the data key and a host computer. The memory, microprocessor, and data port are configured as an integrated unit that is conveniently removable from operative connection with the host computer and portable by a computer user. The encrypted data stored in the memory includes personal identification data associated with a registered user of the data key and transaction account data associated with the registered user of the data key. The system also includes a mobile device registered with the data key and the microprocessor is configured to conduct transactions using the encrypted data in the memory through a dual-device security protocol involving a mobile device registered for use with the data key.

The system may also include an online server operative for participating in the dual-device security protocol by receiving transaction authorization data from the data key via a first communication medium and transmitting the transaction authorization data to the mobile device via a second communication medium. The online server may alternatively participate in the dual-device security protocol by receiving transaction authorization data from the data key via a first communication medium and transmitting transaction authorization data to a transaction server via a second communication medium. In each mode, the first communication medium may be the Internet and the second communication medium may be a telecommunications network.

FIG. 1 is a perspective front view and block diagram of a conveniently removable and portable data storage key 10 and associated system for conducting secure online transactions and other functions. The illustrative data storage key 10, which is housed in a key-shaped case 11, may be structured as a modified universal serial bus (USB) flash drive. The data key 10 includes lightbox touch sensor 12 with a removable wafer 13 that may carry indicia, such as a logo or monogram, or a bio-identifier, such as a fingerprint or gesture sensor. The data key 10 also includes a processor 14, includes a memory (single or multiple memory devices), such as a flash memory, that may be divided into a secured partition 15 and an unsecured general purpose partition 16. These may be separate memory devices, physical partitions or virtual partitions where the secured partition refers to the storage of encrypted data and the unsecured partition refers to the storage of unencrypted data with or without fixed memory locations or sizes dedicated to the individual partitions.

The secured partition 15 contains encrypted data used for secure transactions, such as (but not necessarily limited to) financial and other types of transactions. For example, the secured partition 15 may include credit card and debit card information corresponding to accounts owned by a registered holder of the data storage key 10 along with authenticated identification credentials for the holder often referred to as "federated ID" credentials and Digital ID verification. As additional examples, the secured partition 15 may also contain encrypted email, encrypted social media, encrypted health records, encrypted electronic keys for building or equipment access, encrypted restricted access data, such as data subject to a security clearance, and the like.

The unsecured partition 16 may be conventional flash memory that the holder of the key may utilize the unsecured partition as general purpose removable computer memory. In specific examples, the data storage key 10 may include general purpose flash memory of 5 GB or 10 GB in addition to the secured partition 12 dedicated for use in secured transactions. A relative small amount of flash memory, such as 1 MB, is typically suitable for the dedicated purpose of the secured partition 15. While flash memory is used in the illustrative embodiments, the invention is indifferent to the type and size of memory and may be adapted to other types of non-volatile memory that may become commercially available in the future (e.g., electron spin memory, magnetoelectric memory, nano-RAM memory, and so forth).

The secured memory partition 15 is connected to a secured microprocessor 14 that implements the secured transaction functionality of the data key. The unsecured memory partition 16 and the secured microprocessor 15 may be (but need not necessarily be) separately connected to a data port 22. The data port may be a standard "Type A" USB data port configured to plug into USB ports typically provided on personal computers. While the "Type A" USB is expected to be the most prevalent type of data key, other types of data keys may be provided, such as the "Micro-B" USB port, the UC-EC (non-USB) port, the "Mini-B" USB port typically found on smartphones, tablets, body-worn computers, and so forth. One or more physical end-type adapters that plugs into a given data key port may also be provided to allow the same data key to plug into different types of receptacles (e.g., A-to-Micro B adapter, A-to-Mini-B adapter). This may facilitate the same data key selectively plugging into a host computer and a smartphone, for example, to accommodate transactions involving both types of interfacing devices. It should also be appreciated that wireless communication (e.g., Bluetooth, NFC, RFID, etc.) between the data key and one or more of the devices may obviate the need for a physical port connection between the data key and one or more of the interfacing devices. In a particular embodiment, for example, the data key may include a "Type A" USB port for connecting to a host computer and a wireless connection for communicating with a smartphone. This will accommodate dual-device security for transactions requiring both a data key and a specific smartphone registered to the same authorized user to complete transactions.

In an illustrative embodiment, the unsecured partition 16 is active as general purpose memory upon plugging the data key into an appropriate port in an interfacing device, while the secured microprocessor 14 is connected to the secured partition 15 to enable the secured transaction functionality of the data key when a switch integral to the lightbox switch 12 (typically a capacitive touch sensor or depression switch) on the data key is physically touched or pressed. The lightbox switch 12 may be illuminated by a light emitting device (typically an LED) integral to the lightbox, which may blink to alert the user of the need to touch or press the switch to activate the data key for secure transactions. The requirement of human interaction with the lightbox switch 12 within an appropriate time frame for initiating a secure transaction (e.g., at least one second, but not more than ten seconds, after switch activation) inhibits emulation or "hacking" of the data key by a hacker that is not in physical possession of the data key. As an additional security measure, the lightbox switch 12 in cooperation with the microprocessor 14 and secure memory 15 may enable a bio identifier that limits access to the authorized user of the data key, such a fingerprint sensor, gesture sensor, or a specific touch sequence programmed by the authorized user during an initialization procedure (e.g., double click, triple click, combination of clicks and delays forming a "combination lock" sequence, etc.). The validation fingerprint, gesture, combination code, or other personal identifier is preferably stored as encrypted data on the data key 10 as opposed to the host computer or another component in the system.

The secured transaction functionality and associated secure data stored in the secured partition 15 of the data key enables a range of features. A non-exhaustive list of typical features includes data key firmware and a unique identifier (key ID) assigned to the key for use in security operations. The firmware runs the data key and may load a "thin driver" onto a host computer for communicating with the data key. Since the data key includes a resident microprocessor, the "thin driver" only enables interaction with the input-output and communication devices of the host computer, and does not utilize the processor or applications (e.g., browser) running on the host device. This avoids storing any of the secure data contained on the data key in the host computer, such as cookies stored in browsers. Transaction account numbers are never typed using a keyboard, which avoids hacking through keystroke monitoring.

The security features also include transaction account data (e.g., credit card data, debit card data, bank account data, investment account data, etc.) which may be authenticated and stored as a permanent feature of the data key dedicating the data key to a specific account (e.g., a VISA® account for online purchases issued in the form of a data key). As an option, the user may be able to add and remove transaction accounts from the data key enabling the data key to utilize multiple transaction accounts. In this case, a user interface displayed in the host computer allows the user to select among accounts by "nicknames" previously entered by the user. But the transaction account numbers themselves are communicated directly from data key to the network port of the host computer, without storage on the host computer, to avoid exposing the actual transaction account numbers to the memory and main processor of the host computer. Another security feature is personal identification data for the registered holder of the data key (e.g., federated ID data, digital photo, bio identifier(s), social security number, driver's license number, passport number, resident alien [green card] identification data, etc.), which is typically authenticated and stored as a permanent feature of the data key.

The security features may also include a password manager that allows the registered holder of the data key to create and change a password required to utilize the data key for secure transactions. Typically, the unsecured memory partition 16 may be accessed without a password, while the secured memory partition 15 and the functionality of the microprocessor 14 is password protected. The password manager also includes a password generator for creating secure passwords (e.g., GUID) and encryption keys (e.g. PKI private keys). The data key may also store PKI and token keys used in secure data storage of the secured memory partition 15 and in transmission of financial account data over communication networks (e.g., Internet) to transaction processing servers. While some legacy transaction processing servers may not presently be PKI or token enabled, proliferation of PKI and tokenized security for transaction processing servers is expected. The data key is therefore PKI and token enabled and operational for using PKI encryption with any transaction processing servers that are also PKI enabled to utilize dynamic tokens or cryptograms traditional used in chip-and-pin payment transactions.

The security features may also include the ability to register the data key for operation with a specific user and a specific mobile device, such as a smartphone, that is also registered to the same user. Another security features includes a one-time password (OTP) generator, which generates OTPs for used in secure transactions. In some modes of operation, transactions may require the data key and the mobile device registered to the same user. For example, a transaction initiated by the data key may involve an OTP generated by the data key for the specific transaction, which is sent to the registered mobile device (e.g., by text message to a directory number or email address assigned to the mobile device registered to the same user), which the user must receive (via the registered mobile device) and enter into the data key (via the host computer into which the data key has been plugged). The correlation of data key and mobile device ownership serves as a major security feature (dual-device security) for transactions requiring this feature. The mobile device correlation may therefore be established in a restricted manner, for example when the data key is initialized by the manufacturer, and may be a semi-permanent feature of the data key. Typically, the mobile device correlation may be treated with the same security procedures as the registered user identification date (e.g., federated ID). For example, changing the mobile device correlation or federated ID data may require a replacement data key either by reprogramming by an authorized technician in physical possession of the data key or by online service through an authorized technician having special access codes and credentials as required to register the data key to a different mobile device. While OTPs have been described as a specific example of a transaction-specific security code, other types of security coded may be utilized, such as QR codes, barcodes, and so forth.

The data key is designed to be largely indifferent to the specific host computer and contains complete processor and driver features to work with virtually any host computer utilizing standard interfaces. When plugged into the host computer, the data key receives power from the host computer, which is sufficient for engaging in transactions utilizing a host computer. The data key may also include a wireless antenna 18, which allows the data key to communicate with another device, such as the mobile device registered for use with the data key, without having to unplug the data key from the host computer, provided that the mobile device is in sufficiently close proximity to the data key. In some embodiments, transactions may also be enabled that do not utilize a host computer. A prime example is merchant services including NFC transactions through a "touch-and-go" point-of-sale terminal. In this case, the NFC or other point-of-sale merchant terminal serves as a host computer for the data key even though the data key need not be physically plugged into the point-of-sale terminal (although point-of-sale terminals in the future may be configured with hardware ports for receiving data keys). As another non-plug example, the data key may engage in certain transactions through a mobile device without being physically plugged into the mobile device or any other host computer. In this case, the mobile device serves as the host computer for the data key, which interacts with a mobile app running on the mobile device. The mobile app activate on a mobile pin pad (among other features) that the operator uses to enter an OTP that the data key sends to the mobile device, typically by text message.

An onboard speaker 19 allows the data key 10 to provide audible information, such as beeps, tones, or voice commands that can be used for a range of functions, such as device pairing, indication of secure mode, transaction cues, key-finder, phone-finder and any other feature that can benefit from audible cues produced by the data key. An onboard microphone 20 allows the data key 10 to receive audible information, such as voice commands, tones from a pairing or paired device, and so forth. The microphone can be used for a range of functions, such as speech recognition secure access authentication, speech recognition command processing, tone based interaction with other devices, and any other feature that can benefit from audible information received by the data key. While the speaker 19 and microphone 20 typically operate in the audible range, other sonic and electromagnetic frequencies may be utilized, such as ultrasonic, infrared, radio frequency, and so forth.

Embodiments of the data key may include an antenna 18 and associated onboard battery 17, as NFC array, RFID array, or other power source to power the data key without the need to plug the data key into any interfacing device 23. Embodiments of the data key may also include and one or more wireless chips or features 21, such Bluetooth, NFC, RFID, infrared, or other suitable wireless capability. Embodiments of the data key may further include a hardware data port configured to plug into a host computer with a suitable data port (e.g., USB port), such as a dual-function pin pad 22 that can operate as a 4-pin USB port and an 8-pin chip-and-pin port. For example, the dual-function pin pad 22 can be used to plug the data key 10 into a USB port on a interfacing device 23 to create a plug-in data link 24 between the data key and a host device, access control device, or other type of interfacing device.

The data key 10 implements a number of functional features 25. The list of functional features shown in FIG. 1 is illustrative and not intended to be exhaustive or limiting. Those skilled in the art will appreciate that the hardware, software and communication capabilities of the data key is conducive to implementing a wide range of functions presently known and conceived in the future.

For example, the data key 10 may allows users to store passwords and financial card data (e.g., credit and debit card data) so that online account access and financial transaction can be conducted without the user having to enter passwords or financial card data into host computers or data terminals. This prevents key-stroke detection, which remains a major hacking vulnerability for online account access and financial transaction. The data key also provides the same type of security that chip-and-pin financial cards provide for in-store transactions using. In particular, the data key implements PKI and tokenized encryption of financial card data that is compatible with the existing chip-and-pin financial card infrastructure. The data key can therefore turn any host or paired device into a merchant terminal engaging in tokenized chip-and-pin transactions for online transactions. The data key can also transmit end-user transaction information to another merchant gateway in tokenized format, effectively completing the tokenized chip-and-pin security system all the way to the online retail customer who does not have a merchant account. While this step requires the merchant's transaction gateway to accept tokens from end-user for online transactions, this capability is expected to become generally and ultimately universally available in the future to provide added security for online transactions.

As another functional feature example, the data key 10 may implement dual-device security in which the data key and another device, such as a smartphone, associated with the registered user of the data key must both be operated to activate the key for secure transactions. For example, the data key or another device associated with the data key may generate a one-time password (OTP) or optical code (QR code) that it transmitted to a smartphone associated with the registered user of the data key. That phone must then be used to enter the OTP or hold the QR code up to an optical reader for a transaction to continue. In addition, the lightbox switch 12 may also have to be touched or depressed, optionally with a predefined touch sequence or bio-identifier, in order for the transaction to proceed. Requiring manual input on both devices within a present time period is an effective security measure that prevents most types of fraud.

As another functional feature example, the data key 10 may implement device pairing (e.g., Bluetooth device pairing) and wireless communication between the data key and an interfacing device. Device pairing and communication confirmation via the wireless data link provides a further level of dual-device security, effectively requiring that the both devices are paired and in physical proximity (e.g. 30 feet) in order for a transaction to proceed.

As another functional feature example, device pairing enables other geo-proximity features, such as key-finder where the key begins to beep when pairing communications is lost with the paired phone, and phone finder where the phone begins to beep when pairing communications is lost with the paired key. Causing the phone and key to beep and/or flash whenever pairing communication is lost is a very effective way of preventing either the key or the phone from becoming lost in the first place. In addition, the key may be placed in a "lost device finder" mode, which causes the key to announce and/or display an alarm, for example by beeping and/or flashing lightbox, when the key detects the presence of a previously paired device that has lost its paired connection. This feature will work with any type of paired device (e.g., lost phone, lost firearm, lost card scanner, etc.), where the data key announces and/or displays an alarm whenever it detects the presence of the most recently paired device.

In addition, the phone may record the GPS location of the phone when pairing is lost with the key, and provide the "lost key" location to the user through an app on the phone. As another option, a key that has become lost for a predefined period of time may also begin beeping whenever any phone running a particular app comes into communication range with the lost key. This is accomplished by having the phones periodically poll for lost keys, or having the lost key periodically poll for listening phones. This allows, for example, any subscriber of the data key service to detect any data key lost by another member. The data key itself or an online data key platform can then be used to identify the owner and return the lost phone or data key. For example, a serial number, phone number or website address printed on the data key or identification information displayed when the data key is plugged into a USB port on a computer may be used to identify the owner and return the lost data key. Similarly, the data key app allows any subscriber of the data key service to detect any data key or phone lost by another member.

Device pairing also enables a geo-proximity based panic button feature. For example, a person who has fallen and can't get up, has suffered an accident, has become lost, or is under attack, can quickly and discretely hold the touch sensor on the data key for a predetermined period, or touch a predefined code into the data key, to activate a panic call through the paired phone. This allows the panic call to be initiated without having to pull out the phone, enter a password or activation gesture into the phone, select the telephone feature, and enter 911 into the telephone keypad. The data key is a much easier panic button device for small children, elderly and disabled users, as well as anyone who might suffered an accident or come under attack.

As another functional feature example, the data key 10, with or without device pairing and dual-device security, can be used for secure building and equipment access. For example, a building or firearm lock can be programmed so that the building can only be entered, or the firearm can only be fired, when it is in communication with the data key. Dual-device security including paired-device security can be required for a higher level of security. Data keys and access control devices for building and equipment can be remotely programmed to provide one-time or limited time access to the building and equipment. The data key can interface with building and equipment access control devices through plug-in or wireless data links.

As another functional feature example, the microphone 20 allows the data key to implement speech recognition functions, such as voice recognition as a bio-identifier security feature, and voice commands. Artificial intelligence and other speech recognition techniques may be implemented to personalize and limit data key access to a specific person. The speaker 19 enables the data key to produce audible cues and responses, such as beeps, clicks, tones, chimes, spoken words, music and so forth.

As another functional feature example, the data key can be used to pre-store bank card tokens, which may be loaded prior to delivery to the user or through a post-delivery download procedure. For example, the data key may employ payment tokenization software to apply a token (unique one time use number) to each payment or bank card transaction supported by the key, allowing on-line purchase and other transactions to be associated with the bank card without transferring bank card data (e.g., Primary Account Number (PAN)). A "token vault" on the data key stores a host of one-time use tokens, each of which is paired with the PAN and a proven-identity credential established by the key at activation. Each token is available for one-time use, being uniquely associated with a single transaction to be supported by the key. Payment tokenization software stored on the key or offered by the key provider as a cloud service replaces the traditional external Token Service Provider (TSP), creating and receiving tokens and supporting transactions through an accepted payment tokenization process. The payment tokenization functionality is enabled through the coordinated operation of the key and an interfacing device (e.g., desktop computer, laptop, tablet, smartphone, body-worn computer, Internet-of-things (IOT), etc.). The key stores the payment tokenization software (alternatively accessed via the cloud) along with the token vault, and includes software that enables it to serve as a "master device" controlling the connected "slave device."

As another functional feature example, the data key may store the Primary Account Number (PAN) of the payment or bank card securely on a security chip in the key and provides information related to the PAN to an external Token Service Provider (TSP). The TSP has a secured relationship with the Payment Processors and requests PAN-related information from the key to enable support of online purchases or other consumer transactions. In one approach, the data key provides the TSP with a unique identifier related to the PAN, eliminating the need to ever provide the PAN to an interfacing device or store the PAN at the TSP; thereby enhancing security and eliminating the centralized collection and storage of individuals' PANs and the TSP risk otherwise associated with such storage. In another approach, the key provides the PAN to the TSP for pairing with a token but, after pairing, the PAN remains stored only on the data key, again avoiding centralized storage and consequent TSP risk. The data key stores the PAN in a PAN vault, and also stores a paired proven-identity credential established for the consumer by the key at activation along with software for generating the unique PAN identifier (when employed) and software for interfacing with the connected device and TSP. The connected device stores software that synchronizes the consumer's identity and the PAN-related information with the tokenization capability provided by the TSP. The software on the key enables the foregoing indemnity process and data key's role as a "master device" controlling the connected device and TSP as subordinate "slave devices."

As another functional feature example, the data key may carry out similar tasks for non-payment transactions which can similarly benefit from the decentralized storage of information associated with one use tokens, e.g., for logons, access control, encrypted email, encrypted social media, encrypted personal health records, encrypted classified documents, and the like.

As another functional feature example, the data key may be used for "card-not-present" and "key-must-be-present" financial transactions. The data key enables the payment process associated with card-not-present (e.g., online) transactions to mimic the payment process where a chip card (commonly referred to as a chip-and-pin technology) is present at a POS or ATM machine. Specifically, the security chip embedded in the data key utilizes any or all chip based security card present techniques for securing online payment such as generating a crypto-gram that is unique to the Primary Account Number (PAN) (e.g., an encrypted version of the PAN) and presented to the payment processor and issuing bank as part of the transaction process. The payment processor and issuing bank use software complementary to that embedded in the security chip to decrypt the crypto-gram and determine the PAN associated with a particular transaction. As a result, the PAN does not have to be provided in the clear as is traditionally required for card-not-present transactions, thereby enhancing security. The data key stores the PAN (in a PAN vault) and a paired proven-identity credential established for the consumer during data key activation. The data key's security chip also stores the software for generating the unique crypto-gram to be delivered in support of card-not-present and key-must-be-present transactions.

As another functional feature example, the data key may be used for universal credential authentication. For this example, the data key permanently stores proven-identity (i.e., verified by an independent unrelated trusted third part; federated ID credentials, etc.) of the key user. Initial credentialing and key personalization are performed at the time of key activation. The key can then store all subsequent confirmations of the same user's identity by other independent unrelated trusted parties. These confirmations are stored both as individual credentials and collectively as "trusted community" or "dynamic" credentials that provide an ever-expanding or ever-enhanced confirmation of an individual's identity as initially verified at the time of activation. The identity on the data key functions as a base "identity block" for confirming the identity associated with data key ownership and is mapped to an initial credential block. The initial identity block, initial credential block, and corresponding "confirmation blocks" associated with each subsequent confirmation of identity are aggregated into a dynamic credential by, for example, using a block chain that maintains the continuously-growing list of confirmation blocks in a manner that is secured from tampering and revision. The individual and/or dynamic credentials are paired with secured passwords or encrypted key pairs stored on the data key, which enables multi-factor authentication (who the data key holder is, what he has, and what he knows, such as password logon) of the user when accessing virtually any online account from sources ranging from traditional centralized data bases, payment gateways, servers, web accounts, VPN's, Cloud services, email, social media, health records etc. to decentralized distributed databases like block chain. The data key may also store reciprocal proven-identity credentials associated with the providers or sources of online accounts, enabling software on the key to request and confirm a provider's identity as part of an appropriately adapted account access protocol.

As another functional feature example, the data key may also utilize artificial intelligence based authentication including speech/speaker recognition. The data key provides account access through the biometric process of voice recognition by employing voice recognition software to recognize a voice print that is recorded on the key and paired with a previously established (by an identity proving process) identity credential that is permanently embedded on the data key at the time of key activation. Voice recognition capability is enabled through coordinated operation of the data key and an interfacing device. The data key typically stores the voice print and software that interfaces with a voice recognition program. The connected device typically includes a microphone and the voice recognition software. The data key includes software that enables it to serve as a "master device" controlling the voice recognition functionality of both the key and the connected "slave device."

As another functional feature example, the data key may provide voice navigation through natural language recognition by employing natural language recognition software to recognize language elements (e.g., spoken words) that are mapped to a known script reflecting selectable settings or operations of the key (pre-set or set by user), enabling the user to navigate key functionality through voice-to-script interpretation software. Language recognition capability is enabled through coordinated operation of the data key and an interfacing device. The data key typically includes the mapped language elements and script, the voice-to-script interpretation software, and software that interfaces with a language recognition program. The connected device typically includes a microphone and the natural language recognition software. The data key includes software that enables it to serve as a "master device" controlling the natural language recognition functionality of the key and the connected "slave device."

These features allow the data key provides dual-factor identification for logons and secure data access through a combination of voice recognition and natural language recognition. The two identification factors are the voice print stored on the data key (described above) and the particular logon word(s) that is selected and spoken by the user as part of the logon process. The voice print is biometrically associated with the user and unchangeable, while the logon word(s) is changeable like an alpha numeric script password. The dual-factor identification functionality is enabled through coordinated operation of the data key and interfacing device. The data key stores both identification factors individually and as a pair and typically includes software for interfacing with voice and natural language recognition programs. The connected device typically includes a microphone and the voice and natural language recognition software. The key includes software that enables it to serve as a "master device" controlling the dual-factor identification functionality of the both the key and the connected "slave device."

As another functional feature example, the data key may implement multifactor physical access authentication, in which the data key provides the ability to accept and store access tokens which can be issued and rescinded by a trusted third party wishing to grant a user access to an area subject to physical access control or logistical access control. The access token is controlled, managed, issued and rescinded by the trusted third party. The access token is stored on the key in a token vault. Software on the key or a connected device (PC, table, phone, etc.) enables the user to receive, accept, store, and manage an issued access token. Data key software confirms that the proven-identity permanently embedded on the key at the time of key activation is the same as the identity associated with the access token issued by the trusted third party. The token vault and mapping stays on the key as the "master device" with the connected device as the "slave device."

As another functional feature example, geo-proximity enables both passive (not requiring the user to touch or depress the button on the data key) and active (requiring the user to touch or depress the button on the data key) features through a Bluetooth (BLE) wireless data link. Passive features that do not require the user to activate a switch on the data key may include a "phone-must-be-present" feature in which the phone has to be present within about 30 feet (9 meters) of the data key to enter the password to activate the data key when the data key is inserted into a host or access control device. For a "key-must-be-present" feature, the data key must to be present within about 30 feet (9 meters) of the paired phone to access an associated application on the phone. For a key-finder feature, a paired phone with GPS tracking capability records the last GPS location where the key and phone were paired. In addition, the data key may beep when a "data key finder app" is activated on the phone, and beep a different sequence when pairing is lost between the phone and the key. Active features that require the user to activate a switch on the data key may include clicking the button on the data key to access secured files and features implemented by the key. Similarly, the phone may provide distinctive audio and visual messages when pairing is lost with the key, along with recording the GPS location when the pairing is lost. The data key button may also be used to enable password entry, secured payment, find a paired phone, activate the panic button feature (e.g., call 911 through the paired phone), or other features. Different tough or click patterns, button hold times or gestures may activate different functions.

As another functional feature example, the data key and phone may be configured to communicate over a larger distance for the panic button feature as compared to other paired-device communications. For example, a capacitor within the data key may store sufficient charge to power short burst, longer distance panic button transmissions. The data key and phone may also utilize a frequency well below the Bluetooth frequency for short burst, longer distance panic button transmissions. For example, the data key and phone may utilize a frequency in the hundreds of MHz range for panic button transmissions, while other paired-device communications may be in the single-digit GHz range. To provide a specific example, the data key may transmit panic button signals at emergency transmission frequencies currently available at 121.5 MHz, 243.0 MHz and 406 MHz emergency channels, while utilizing the currently available Bluetooth frequencies between 2.402 GHz and 2,480 GHz for other paired-device communications. The data key may also make a first panic-button transmission or series of transmissions at Bluetooth frequencies, and then switch to an emergency transmission frequency if an acknowledgement is not received from the phone to the initial panic button transmissions at the Bluetooth frequency.

Figure 2:
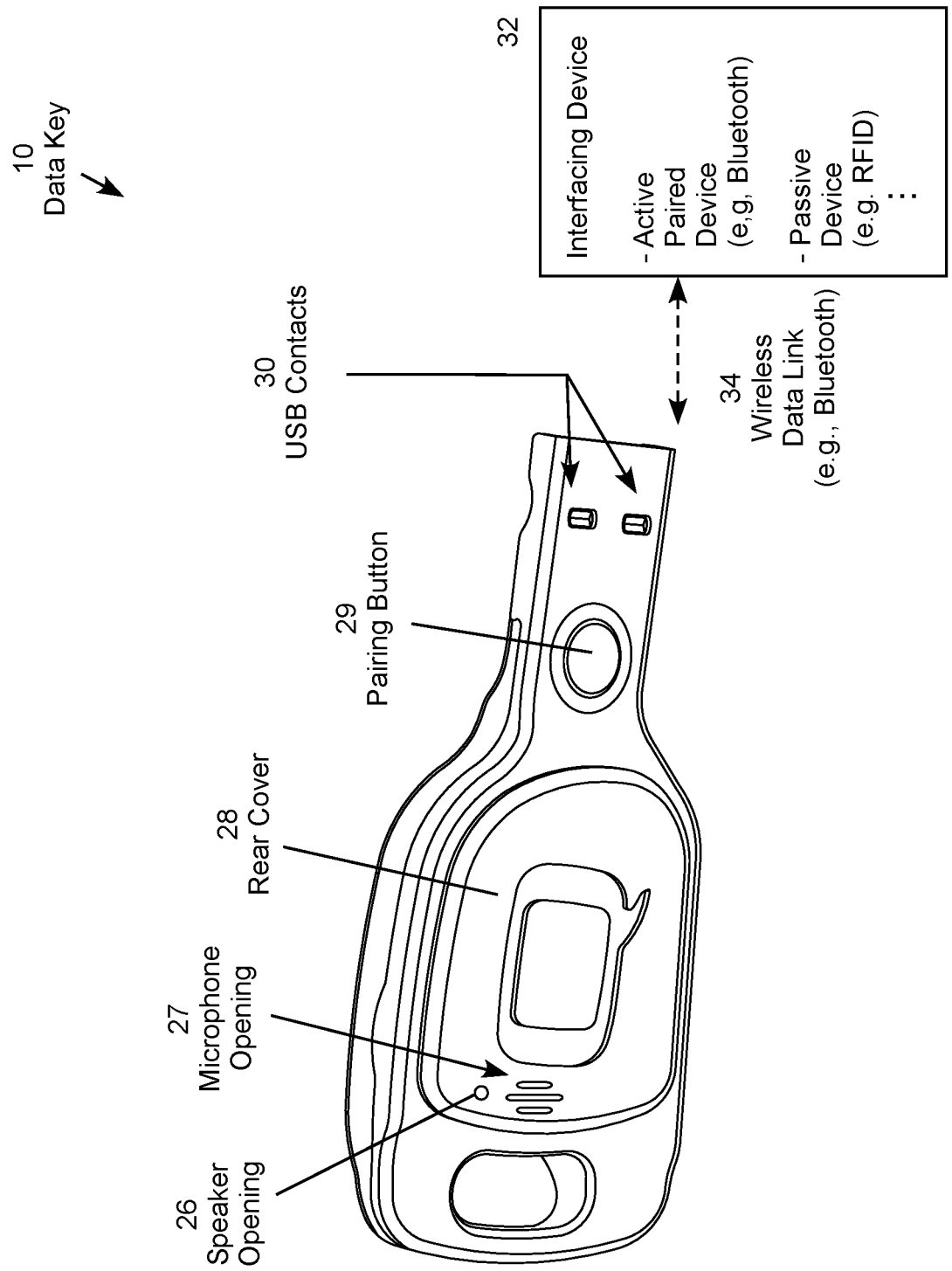
FIG. 2 is perspective rear view of the data key.

FIG. 2 is perspective rear view of the data key 10. The physical features visible on the rear of the data key include an optional speaker opening 26, an optional microphone opening 27, and rear cover 28 to house the microphone, speaker and battery. The features visible on the rear side of the data key 10 also include a pairing button 29 and USB contacts 30. The pairing button 29 can be used to pair the data key 10 with other interfacing device 32 using Bluetooth, NFC, RFID or another suitable frequency to create a wireless data link 34 between the data key and the interfacing device. The interfacing device 34 may operate as an active paired device (e.g. Bluetooth device), passive wireless device (e.g., passive RFID device), and/or a host device interconnecting the data key to a public or private network. For example, the interfacing device may be a smartphone, smartcard, tablet, body-worn computer, laptop computer, desktop computer, computer in a vehicle, computer in a smart television, merchant terminal, scanner, camera, printer, firearm lock, vehicle ignition lock, equipment lock, and so forth. In a particular embodiment, the pairing button 29 can be used to pair the data key 10 with a smartphone to enable a number of geo-proximity features that utilize the data key and the smartphone, such as key-finder, phone-finder, panic button, dual-device security, merchant services, and so forth.

Figure 3:
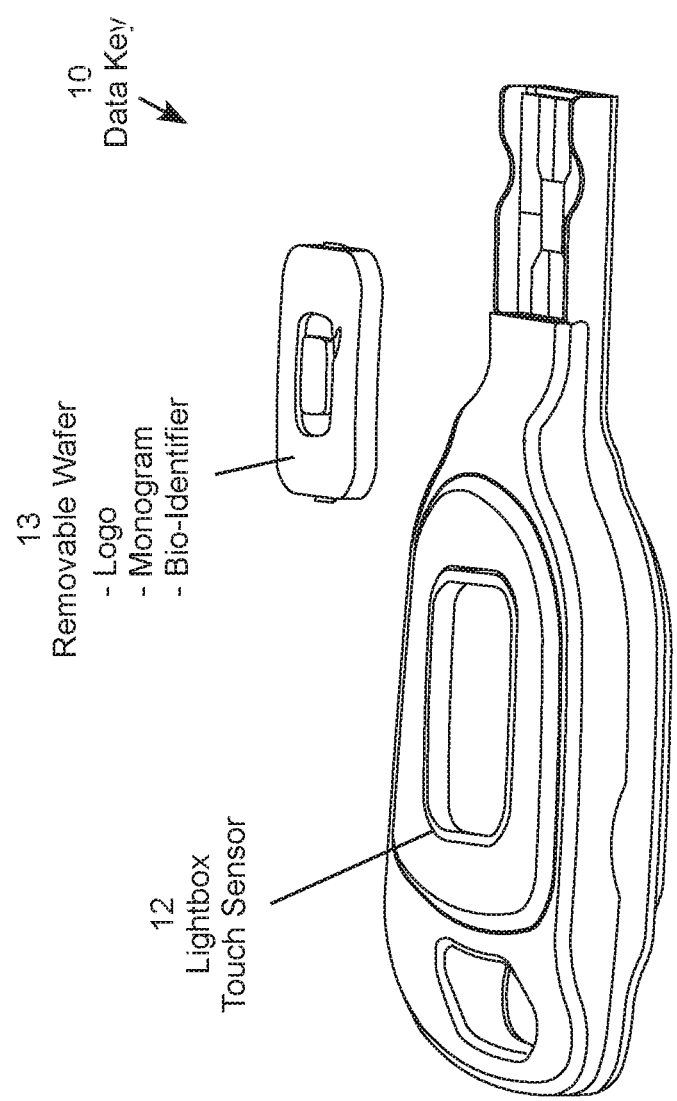
FIG. 3 is perspective front view of the data key showing a wafer that is removable from a lightbox of the data key.

FIG. 3 is perspective front view of the data key 10 showing the wafer 13, which is removable from the lightbox 12 of the data key. The removable wafer 13 can be used to personalize the data key with a logo, monogram, bio-identifier, gesture identifier, or other item selected by the user, vendor or manufacturer. The wafer 13 is typically transparent or translucent allowing light emitted by the lightbox 12 to illuminate and pass through the wafer. The wafer 13 may also be non-conductive so that it does not interfere with capacitive touch detection by the lightbox 12. As another option, the wafer 13 may be configured to filter or pass gesture information or a bio-identifier, such as a fingerprint or retina scan, to the lightbox.

Figure 4:
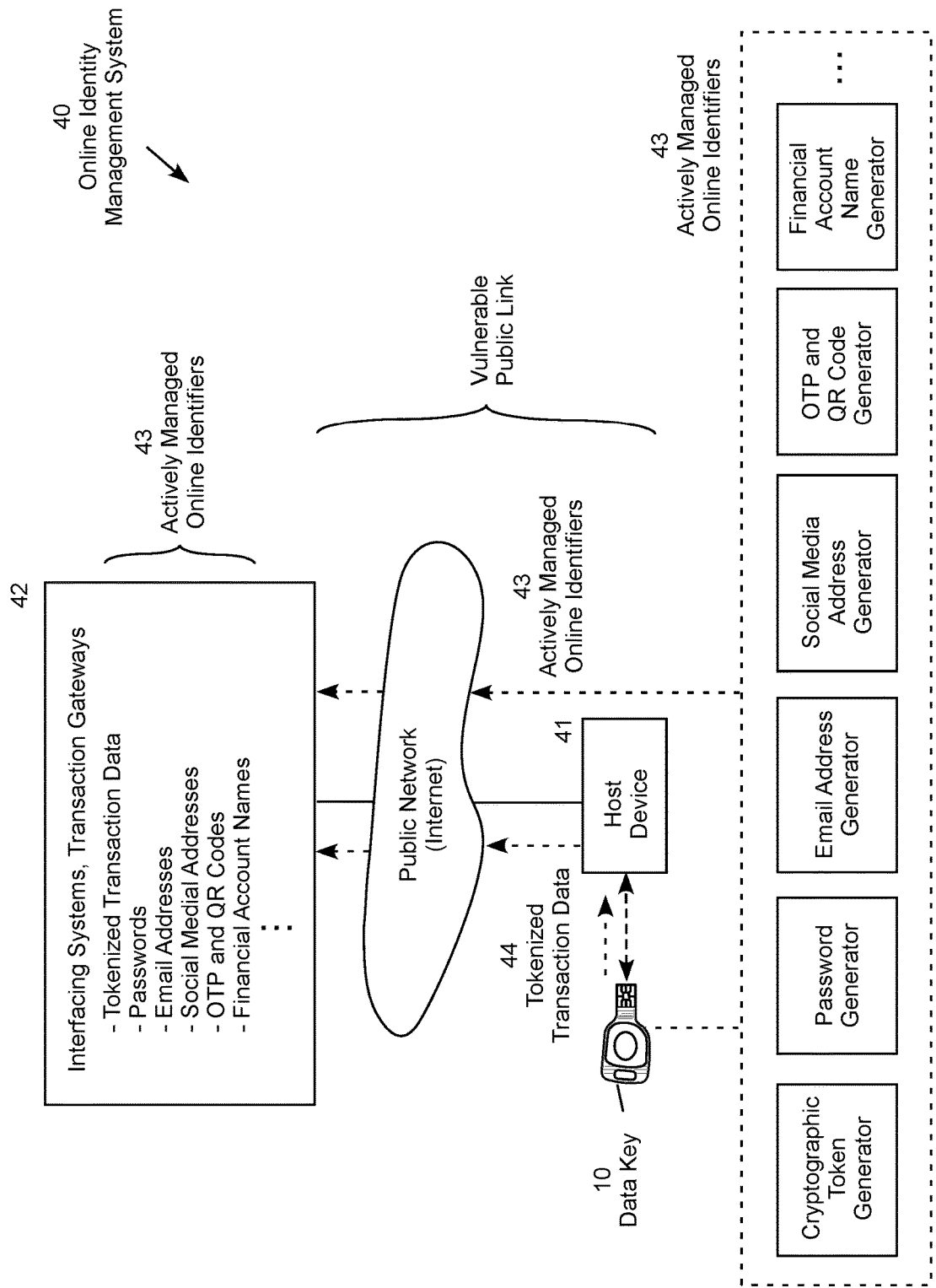
FIG. 4 is a block diagram illustrating use of the data key in an online identity management system.

FIG. 4 is a block diagram 40 illustrating use of the data key 10 in an online identity management system. The data key 10 accesses a public network, such as the Internet, through a plug-in or wireless connection with a host device 41, such as a laptop computer, tablet, body-worn computer, smartphone or any other network enabled device. The data key utilizes the host device to interact with a wide range of interfacing systems and transaction gateways 42 over the public network. Communications exchanged over the public network are vulnerable to interception, hacking, falsification, etc. from a wide range of potential intruders with access to the public network. FIG. 4 illustrates several security features 42 implemented by the data key to combat these security threats.

For example, the data key includes an onboard processor and memory it to utilize the network interface resources of the host device 41 without storing, processing or otherwise exposing any secure data held on the key to the processor or memory devices of the host device. The data key includes an email address generator, social media address generator, OTP and QR code generator, and a financial account name generator to actively manages the online identifiers (e.g., passwords, email addresses, social media addresses, OTPs, QR codes, financial account names, etc.) that hackers and identity thieves steal and emulate to perpetuate their crimes. Allowing these online identifiers 43 to persist from transaction to transaction exposes them to theft and use by others. The data key 10 eliminates this risk by resetting the online identifiers after each transaction, effectively turning these parameters into limited-use or one-time use parameters. These parameters are transparent to the user because they are managed by the data key, which allows the data key to change them as often as desired using secure, non-intuitive data strings and cryptograms. Active managing and frequently changing these parameters in a manner that is transparent to the user represents a great improvement in online identity and transaction security.

FIG. 4 also includes a cryptographic token generator enabling the transmission of tokenized transaction data 44 across the public network, which effectively brings chip-and-pin type security to online transactions. The data key 10 stores the user's financial account numbers, which are converted into tokenized transaction data, without the user having to manually enter the account number or allowing them to be stored in cookies or other locations on the host device 41 or the interfacing systems and transaction gateways 42. This is another powerful security improvement for online transaction, effectively eliminating the public network as a vulnerable security link.

Figure 5:
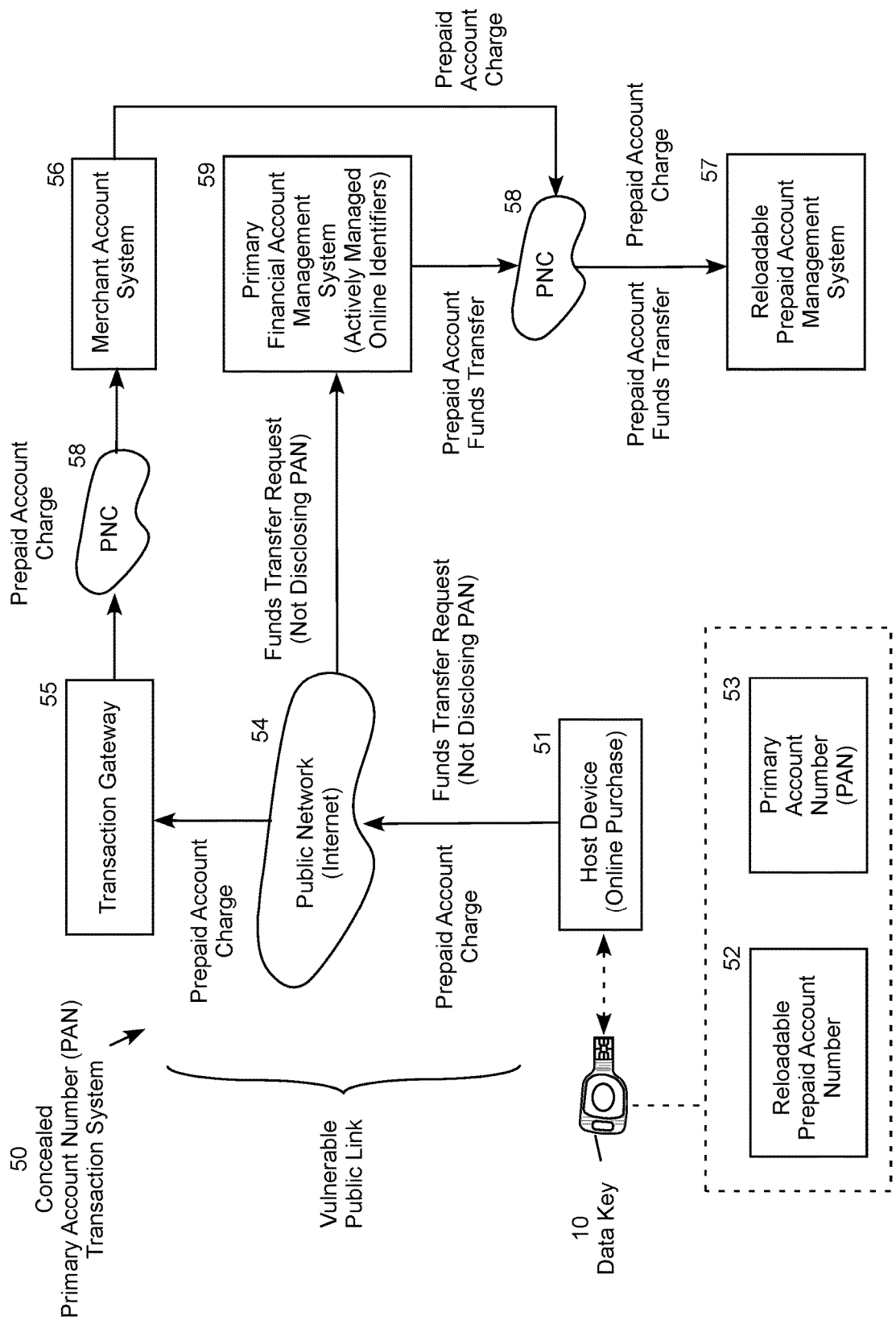
FIG. 5 is a block diagram illustrating use of the data key in a concealed primary account number (PAN) transaction system.

FIG. 5 is a block diagram 50 illustrating use of the data key 10 in a concealed primary account number (PAN) transaction system. This technique provides for improved online transaction security and backward compatibility even in situations where the infrastructure is not configured to accept tokenized transaction data across the public network. This is an important security measure that may be implemented as a bridge to full cryptographic security until credit and debit account transaction gateways used for online commerce are universally configured to accept tokenized transaction data across the public network. In the procedure illustrated by block diagram 50, the data key 10 utilizes a host device 51 along with a reloadable prepaid account represented by a reloadable prepaid account number 52 and any number of primary financial accounts number represented by a primary accounts number (PAN) 53. Although the data key charges online transactions to the PAN, it only exposes the reloadable prepaid account number 52 to the public network. The prepaid account is reloadable and charged on a transaction-by-transaction basis without having any other credit or debit balance available to steal. As a result, even if a thief were to steal the transaction data off the public network, they would only be able to access a reloadable prepaid account with the negligible account balance.

The data key 10 implements a concealed PAN transaction by responding to an online transaction request with a prepaid account charge and a funds transfer request transmitted over the public network 54. The prepaid account charge for the amount of the purchase, which contains the reloadable prepaid account number 52 but not the PAN 53, is directed over the public network 54 to the transaction gateway 55. The prepaid account charge may then be transmitted to the merchant account system 55 and other components of the financial transaction system, ultimately reaching the reloadable prepaid account management system (bank) 57 over the Professional Network Connections (PNC) 58. The PNC network is the private, token-enabled enterprise network used by financial institutions to conduct secure financial transactions.

To reload the prepaid account with an equal amount of funds to cover the purchase, the data key 10 also sends a funds transfer request over the public network 54 to the PAN management system (bank) 59. The funds transfer request identifies the account holder, reloadable prepaid account number 52, and the transfer amount, but does not include the full PAN. Since the purchaser using the data key 10 holds an account with the PAN management system (bank) 59, the funds transfer request need only identify account owner and the PAN using shorthand terms or nicknames that the PAN management system (bank) 59 recognizes. For example, the funds transfer request may include the account owner's name or nickname, password, and the last four digits or nickname associated with the PAN. If the reloadable prepaid account number 52 has been previously registered with the PAN management system 59, the reloadable prepaid account number may also be identified by the last four digits, nickname or other identifier that does not reveal the full prepaid account number.

The PAN management system (bank) 59 then sends the funds transfer to the prepaid account management system (bank) 57 over the secure PNC 58, where it matches up with the prepaid account charge to cover the cost of the online transaction. Although the prepaid account funds transfer may include the full PAN 53 and/or the full prepaid account number 52, it is transmitted over the secure PNC network 58 rather than the public network 54, eliminating the public network as a point of security vulnerability. For added security, the data key 10 may actively manage one or more of the parameters used for the funds transfers, for example by changing the password and/or nicknames stored by the PAN management system 57 as desired, for example after each transaction. Since all PAN management systems currently allow account holders to provisions accounts for funds transfers, no infrastructure changed need be implemented for this type of concealed PAN transaction utilizing the public network 54. The concealed PAN transaction therefore provides an effective security bridge avoiding the current vulnerabilities of the public network link until the public network is configured to accept tokenized transaction data without requiring significant changes to the existing financial transaction infrastructure.

FIG. 6 is a block diagram 60 illustrating multiple uses of the data key 10, which may utilize plug-in and wireless links to interact with a wide range of local interfacing devices 62, including host devices that provide further connection to online interfacing systems 64. In this illustrative embodiment, the data key 10 includes a dual-function pin pad 22 allowing it to operate as a conventional 4-pin USB connector as well as a conventional 8-pin connector used for financial chip cards. The Bluetooth pairing capability provides additional interfacing capabilities. It is anticipated that data keys will be able to interact with an increasing wide range of devices and systems as computer interfaces and the Internet of things (IOT) continue to proliferate. This single ingenious device can be used for a host of functions effectively replacing and providing local and online security for credit and debit cards, building and equipment access keys and cards, insurance cards, secure personal health records, medical test data, exercise data. email, social media, pictures, and the list goes on and on. The data key therefore provides the onboard microprocessor, secure memory, general purpose memory, data port, and range of security and menu-driven user interface capabilities uniquely provisioning it to become a person's main personal data and security key.

Many of the data key functions may require the user to touch or depress (click) the button on the data key, in some cases with a predefined pattern or gesture, or through a bi-identifier, to authorize a secure transaction. For example the touch sensor may be temporarily activated when the data key is receives an RFID polling (reader) signal, allowing the user to touch the button to complete a transaction using an RFID link, including a normally passive RFID link. This will enable the data key to be selectively used for currently and future passive and active RFID systems, such as retail check-out, train and bus commutation ticket, automobile toll pass, parking meter, fuel station, electric vehicle charging, building access, inventory management, equipment interrogation, and other RFID systems. As another example, the touch sensor may be temporarily activated when the data key is received in or wirelessly polled by an authorized health care provider or first responder system, where the level of access (e.g., secured versus general purpose memory) may depend on the type, prior authorization or authorization level of the interfacing device. This will enable the data key to be used to transmit the personal health record to an authorized health care provider or first responder on an as-needed basis. The data key may also store certain health care data in the general purpose memory partition, such as emergency care information, while maintaining more detailed health care data in the restricted-access secure memory partition. The emergency care information may be available to first responder readers, such as RFID, emergency vehicle readers and other types of readers available to first responder, while restricting more detailed personal medical information to properly credentialed medical providers.

As another example among many, a person's data key may be configured to provide access to multiple tangible and intangible assets and other features, such as financial accounts, merchant accounts, building access, vehicle access, computer access, equipment access, firearm access, security credentials, location monitoring, exercise monitoring health monitoring, and so forth. For example, an operative may receive data and access codes for a particular assignment on (or download onto) a data key, which allow them access to particular buildings, vehicles, firearms, and computer files and other equipment for a limited time for the purpose of completing the assignment. This sensitive data may be encrypted and limited to the assigned individual by bio-identifier, such as fingerprint or touch code. Specific examples include examination taking, guest access to restricted areas and equipment, access to military facilities, repair assignments, remediation assignments, and so forth. For example, a person's data key may be configured to operate a firearm lock restricting use of the owner's firearms to people carrying the data key.

FIG. 6 includes an illustrative yet partial list of local interfacing and host devices 62, including a desktop computer, laptop computer, tablet, smartphone, external memory, scanner, card reader, printer, camera, point of sale terminal, vending machine, food dispenser, medication dispenser, building access control device, equipment access control device, firearm lock, credential issuance, security clearance issuance, chemical tester, equipment computer, vehicle computer, fuel dispenser, electric vehicle charger, parking meter, exercise machine, blood pressure tester, blood sugar tester, cholesterol tester, X-Ray machine, CT, EEG, EKG scanner, MRI scanner, sleep monitor, health professional computer, insurance computer, time clock, stop watch, residential systems, point-of-sale RFID, toll booths, game, gambling devices, and so forth. FIG. 6 also includes an illustrative yet partial list online system 64 that may work in concert with the data key 10 via a network-enabled host device, including data key administration, transaction gateway, merchant gateway, medical data storage, healthcare providers, personal trainer, dietician, insurance, cloud storage, encrypted email storage, encrypted social media storage, access control administration, security clearance administration, residential security, and residential control.

FIG. 7 is a conceptual diagram illustrating a connection adaptor 70 that may be used with the data key. A variety of such adapters may be used to allow the data key to plug directly into devices with different types of data pots, such as iPhones, Andriod phones, cameras, video recorders, scanners, printers, card readers, building locks, equipment locks, firearm locks, parking meters, and so forth. FIG. 8 is a conceptual diagram illustrating a battery charger 80 with a 120 Volt household electric plug 82 used with the data key. The battery charger 80 may be configured to receive the data port of the data key itself, battery 84 for the data key (e.g., a spare battery for the data key), or both.

It should be understood that the foregoing relates only to the exemplary embodiments of the present invention, and that numerous changes may be made therein without departing from the spirit and scope of the invention as defined by the following claims.

The invention claimed is:

1. A data key comprising a microprocessor, a non-volatile solid state memory, a wireless transmitter, a USB plug, a touch sensor or depression sensor, and a non-transitory computer storage medium storing computer-executable instructions that when executed by the microprocessor causes the microprocessor to perform the steps of:
pairing a mobile device with the microprocessor;
receiving user data;
encrypting the user data;
storing the encrypted user data in the non-volatile solid state memory;
receiving a transaction request;
in response to receiving the transaction request, determining whether the microprocessor is in communication with the paired mobile device;
in response to determining that the microprocessor is in communication with the paired mobile device, communicating transaction data associated with the user data to a transaction processor according to a format of the transaction processor through the USB plug, through a host device in communication with the USB plug, and over a public network in communication with the host device and the transaction processor;
wherein the computer-executable instructions when executed by the microprocessor further cause the microprocessor to perform the step of communicating the transaction data to the transaction processor in response to detecting user interaction with the touch sensor or depression sensor in addition to determining that the microprocessor is in communication with the paired mobile device.

2. A data key comprising a microprocessor, a non-volatile solid state memory, a wireless transmitter, a USB plug, and a non-transitory computer storage medium storing computer-executable instructions that when executed by the microprocessor causes the microprocessor to perform the steps of:
registering the data key to an authorized user;
registering an authorized mobile device associated with the authorized user to pair with the microprocessor;
pairing the authorized mobile device with the microprocessor;
receiving user data;
encrypting the user data;
storing the encrypted user data in the non-volatile solid state memory;
receiving a transaction request;
in response to receiving the transaction request, determining whether the microprocessor is in communication with the paired authorized mobile device;
in response to determining that the microprocessor is in communication with the paired authorized mobile device, communicating transaction data associated with the user data to a transaction processor according to a format of the transaction processor through the USB plug, through a host device in communication with the USB plug, and over a public network in communication with the host device and the transaction processor;
wherein the USB plug further comprises a dual-function pin pad operative as a 4-pin USB port and as an 8-pin chip-and-pin port, wherein the computer-executable instructions when executed by the microprocessor further cause the microprocessor to perform the step of communicating the transaction data to the transaction processor through the dual-function pin pad.

3. The data key of claim 1, wherein the computer-executable instructions when executed by the microprocessor further cause the microprocessor to perform the step of communicating the transaction data to the transaction processor in public key infrastructure (PKI), token or cryptogram encrypted format.

4. The data key of claim 1, wherein the computer-executable instructions when executed by the microprocessor further cause the microprocessor to perform the step of communicating the transaction data to the transaction processor in response to receiving a password in addition to determining that the microprocessor is in communication with the paired mobile device.

5. The data key of claim 1, wherein the computer-executable instructions when executed by the microprocessor further cause the microprocessor to perform the step of communicating the transaction data to the transaction processor in response to receiving a bio-identifier in addition to determining that the microprocessor is in communication with the paired mobile device.

6. The data key of claim 1, wherein the user interaction with the touch sensor or depression sensor comprises a combination code entered through the touch sensor or depression sensor.

7. A data key comprising a microprocessor, a non-volatile solid state memory, a wireless transmitter, a USB plug, and a non-transitory computer storage medium storing computer-executable instructions that when executed by the microprocessor causes the microprocessor to perform the steps of:
  pairing a mobile device with the microprocessor;
  receiving user data;
  encrypting the user data;
  storing the encrypted user data in the non-volatile solid state memory;
  receiving a transaction request;
  in response to receiving the transaction request, determining whether the microprocessor is in communication with the paired mobile device;
  in response to determining that the microprocessor is in communication with the paired mobile device, communicating transaction data associated with the user data to a transaction processor according to a format of the transaction processor through the USB plug, through a host device in communication with the USB plug, and over a public network in communication with the host device and the transaction processor;
  generating a one-time-password (OTP) or quick response (QR) code, communicating the one-time-password (OTP) or quick response (QR) code to the paired mobile device, and communicating the transaction data to the transaction processor in response to the paired mobile device receiving user entry of the one-time-password (OTP) or quick response (QR) code in addition to determining that the microprocessor is in communication with the paired mobile device.

8. The data key of claim 7, wherein the computer-executable instructions when executed by the microprocessor further cause the microprocessor to perform the step of communicating the transaction data to the transaction processor utilizing a chip-and-pin transaction security protocol associated with the transaction processor.

9. The data key of claim 7, wherein the computer-executable instructions when executed by the microprocessor further cause the microprocessor to receive the transaction request from the paired mobile device through the wireless transmitter.

10. The data key of claim 7, wherein the computer-executable instructions when executed by the microprocessor further cause the microprocessor to receive the transaction request from a device other than the paired mobile device.

11. The data key of claim 7, wherein the paired mobile device comprises a mobile telephone.

12. The data key of claim 1, wherein the computer-executable instructions when executed by the microprocessor further cause the microprocessor to perform the step of communicating the transaction data to the transaction processor in response to generating a one-time pin (OTP), wirelessly transmitting the OTP to the paired mobile device, and wirelessly receiving the OTP from the paired mobile device.

13. The data key of claim 1, wherein the computer-executable instructions when executed by the microprocessor further cause the microprocessor to perform the step of communicating the transaction data to the transaction processor in response to generating a one-time pin (OTP), transmitting the OTP to the host device through the USB plug, and receiving the OTP from the paired mobile device through the wireless transmitter.

14. The data key of claim 1 wherein the USB plug further comprises a dual-function pin pad operative as a 4-pin USB port and as an 8-pin chip-and-pin port, wherein the computer-executable instructions when executed by the microprocessor further cause the microprocessor to perform the step of communicating the transaction data to the transaction processor through the dual-function pin pad.

15. The data key of claim 7, wherein the USB plug further comprises a dual-function pin pad operative as a 4-pin USB port and as an 8-pin chip-and-pin port, wherein the computer-executable instructions when executed by the microprocessor further cause the microprocessor to perform the step of communicating the transaction data to the transaction processor through the dual-function pin pad.

16. The data key of claim 2, wherein the computer-executable instructions when executed by the microprocessor further cause the microprocessor to perform the step of communicating the transaction data to the transaction processor in response to detecting user interaction with the touch sensor or depression sensor in addition to determining that the microprocessor is in communication with the paired mobile device.

17. The data key of claim 7, wherein the computer-executable instructions when executed by the microprocessor further cause the microprocessor to perform the step of communicating the transaction data to the transaction processor in response to detecting user interaction with the touch sensor or depression sensor in addition to determining that the microprocessor is in communication with the paired mobile device.

18. The data key of claim 1, wherein the computer-executable instructions when executed by the microprocessor further cause the microprocessor to perform the step of generating a one-time-password (OTP) or quick response (QR) code, communicating the one-time-password (OTP) or quick response (QR) code to the paired mobile device, and communicating the transaction data to the transaction processor in response to the paired mobile device receiving user entry of the one-time-password (OTP) or quick response (QR) code in addition to determining that the microprocessor is in communication with the paired mobile device.

19. The data key of claim 2, wherein the computer-executable instructions when executed by the microprocessor further cause the microprocessor to perform the step of generating a one-time-password (OTP) or quick response (QR) code, communicating the one-time-password (OTP) or quick response (QR) code to the paired mobile device, and communicating the transaction data to the transaction processor in response to the paired mobile device receiving user entry of the one-time-password (OTP) or quick response (QR) code in addition to determining that the microprocessor is in communication with the paired mobile device.

* * * * *